United States Patent
Belmonte et al.

(10) Patent No.: US 10,865,897 B2
(45) Date of Patent: Dec. 15, 2020

(54) NON-RETURN VALVE FOR A SOLENOID VALVE AND ASSOCIATED SOLENOID VALVE

(71) Applicant: Robert Bosch GmbH, Stuttgart (DE)

(72) Inventors: Enrico Belmonte, Marbach am Neckar (DE); Ingo Buchenau, Sulzberg (DE); Martin Winkler, Sonthofen (DE); Michael Hilden, Obersulm-Eschenau (DE); Rene Schepp, Waiblingen (DE); Thomas Weitze, Mt. Pleasant, SC (US); Thorsten Schelldorf, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 15/634,562

(22) Filed: Jun. 27, 2017

(65) Prior Publication Data
US 2018/0010703 A1    Jan. 11, 2018

(30) Foreign Application Priority Data
Jul. 11, 2016 (DE) .......................... 10 2016 212 562

(51) Int. Cl.
*F16K 15/18* (2006.01)
*F16K 15/02* (2006.01)
*F16K 31/06* (2006.01)

(52) U.S. Cl.
CPC ............ *F16K 15/18* (2013.01); *F16K 15/021* (2013.01); *F16K 31/0655* (2013.01)

(58) Field of Classification Search
CPC ...... F16K 15/021; F16K 15/026; F16K 15/18; B60T 8/363
See application file for complete search history.

(56) References Cited

U.S. PATENT DOCUMENTS 2,960,998 A * 11/1960 Sinker ...................... F16K 1/46
137/542
5,522,426 A * 6/1996 Zutt ...................... B60T 8/3615
137/533.13
(Continued)

FOREIGN PATENT DOCUMENTS

CN      1760575 A    4/2006
CN    104405906 A    3/2015
(Continued)

OTHER PUBLICATIONS

English Machine Translation of FR-2699640-A1.*

*Primary Examiner* — Craig M Schneider
*Assistant Examiner* — Nicole Gardner
(74) *Attorney, Agent, or Firm* — Maginot, Moore & Beck LLP

(57) ABSTRACT

A non-return valve for a solenoid valve includes a non-return valve seat and a movable closure element. The valve seat is arranged at an edge of a fluid channel. The movable closure element is configured to carry out a direction-orientated throughflow and sealing function. The closure element includes a sealing cone, an abutment base, and a resilient sealing ring. The sealing ring is arranged between the abutment base and the sealing cone. The abutment base forms, in the event of sealing, a support face for the resilient sealing ring. At an edge of the non-return valve seat there is a first support face which in the event of sealing forms with a second support face which is formed at the outer edge of the abutment base in the direction of the non-return valve seat a mechanical axial stop for the movable closure element.

11 Claims, 3 Drawing Sheets

(56) References Cited

U.S. PATENT DOCUMENTS

| | | | | |
|---|---|---|---|---|
| 6,189,983 B1* | 2/2001 | Volz | ............... | B60T 8/365 137/596.17 |
| 6,189,985 B1* | 2/2001 | Fritsch | ............... | B60T 8/36 137/550 |
| 6,254,199 B1* | 7/2001 | Megerle | ............... | B60T 8/363 137/550 |
| 6,382,250 B1* | 5/2002 | Gruschwitz | ............... | B60T 8/341 137/519 |
| 6,846,049 B2* | 1/2005 | Obersteiner | ............... | B60T 8/363 137/596.17 |
| 7,134,640 B2* | 11/2006 | Koeder | ............... | B60T 8/363 251/129.15 |
| 7,243,899 B2* | 7/2007 | Acar | ............... | B60T 8/363 251/129.02 |
| 7,467,780 B2* | 12/2008 | Kratzer | ............... | B60T 8/363 251/129.02 |
| 2002/0189687 A1* | 12/2002 | Linthorst | ............... | F16K 15/026 137/522 |

FOREIGN PATENT DOCUMENTS

| | | | | |
|---|---|---|---|---|
| DE | 10 2007 042 717 A1 | 3/2009 | | |
| FR | 2699640 A1 * | 6/1994 | ............... | F16K 15/026 |

\* cited by examiner

NON-RETURN VALVE FOR A SOLENOID VALVE AND ASSOCIATED SOLENOID VALVE

This application claims priority under 35 U.S.C. § 119 to patent application number DE 10 2016 212 562.1, filed on Jul. 11, 2016 in Germany, the disclosure of which is incorporated herein by reference in its entirety.

BACKGROUND

The disclosure is based on a non-return valve for a solenoid valve. The present disclosure also relates to a solenoid valve having such a non-return valve.

From the prior art, there are known solenoid valves having a magnet subassembly, a valve cartridge and a lower valve portion, in which there are formed between a fluid inlet and a fluid outlet a first fluid channel whose flow cross-section can be adjusted by means of a main valve and a second fluid channel whose flow cross-section can be adjusted by a direction-orientated non-return valve. Such solenoid valves may, for example, be used in an anti-lock braking system (ABS) or a traction control system (TCS) or an electronic stability program (ESP).

DE 10 2007 042 717 A1 discloses a solenoid valve having a magnet subassembly, a valve cartridge and a lower valve portion. The valve cartridge comprises an armature which is movably guided within a capsule, a valve insert, a tappet which is movably guided inside the valve insert and which has a closure member with a main sealing element, and a valve body with a main valve seat. Between a fluid inlet and a fluid outlet, there is formed a first fluid channel whose flow cross-section can be adjusted by means of a main valve which has the main sealing element which is connected to the closure member and the main valve seat which is arranged in the valve body, wherein a magnetic force which is produced by the magnet subassembly moves the armature and the tappet and introduces the main sealing element into the main valve seat in a sealing manner in order to carry out a sealing function. In addition, there is formed between the fluid inlet and the fluid outlet in the lower valve portion a second fluid channel whose flow cross-section can be adjusted by means of a direction-orientated non-return valve. In addition, there is disclosed a closure element for the non-return valve which has a sealing cone, an abutment base with four discharge grooves which are formed on the edge and a resilient sealing ring which is arranged between the abutment base and the sealing cone and which is constructed as an O-ring. The discharge grooves each form a support edge for the resilient sealing ring in the event of sealing. The sealing cone is carried by the fluid flow and the sealing ring which is constructed as an O-ring can also be pressed with low system pressures into the non-return valve seat which is constructed as a hollow cone. As the system pressure increases, the sealing cone is more powerfully pressed into the valve seat and seals with the sealing element which is constructed as an O-ring in the valve seat and retains in an increasingly tight manner as the pressure difference increases. In an opening direction, the sealing cone is placed by the fluid flow against the abutment and the fluid can flow freely through the fluid channel and the discharge grooves. As a result of overloading, in the event of sealing, in the region of the support edges excessively large local tensions may be produced on the sealing element, whereby the service-life of the sealing element can be shortened.

SUMMARY

The non-return valve for a solenoid valve having the features described below has the advantage that with the same basic functionality additionally increased demands with respect to the load-bearing capacity and the sealing over the service-life can be complied with.

Embodiments of the non-return valve according to the disclosure for a solenoid valve, as a result of the new geometric configuration of the abutment base with an abutment face without discharge grooves and with a mechanical axial stop for the closure element, advantageously reduce the local tensions which may occur in the event of sealing in the resilient sealing ring. As a result of the new geometric configuration of the non-return valve, there are produced two support faces which are preferably constructed as flat faces, and consequently the axial mechanical stop which relaxes the resilient sealing ring. As a result of the new configuration of the two support faces on the lower valve portion and on the abutment base of the closure element, the surface pressure of the sealing ring which is produced under a pressure loading can advantageously be significantly reduced. The optimized abutment base leads in the event of sealing as a result of the mechanical axial stop to a limitation of the abutment force acting on the resilient sealing ring. In addition, as a result of the removal of the axial discharge grooves and the abutment face which is formed, an additional extrusion of the sealing ring is advantageously prevented.

Embodiments of the present disclosure make provision for a non-return valve for a solenoid valve which comprises a non-return valve seat which is arranged at the edge of a fluid channel and a movable closure element for carrying out a direction-orientated throughflow and sealing function. The closure element has a sealing cone, an abutment base and a resilient sealing ring which is arranged between the abutment base and the sealing cone. The abutment base forms in the event of sealing a support face for the resilient sealing ring. In this instance, at the edge of the non-return valve seat there is formed a first support face which in the event of sealing forms with a second support face which is formed at the outer edge of the abutment base in the direction of the non-return valve seat a mechanical axial stop for the movable closure element.

In addition, a solenoid valve having a magnet subassembly, a valve cartridge and a lower valve portion is proposed. In this instance, there is formed between a fluid inlet and a fluid outlet a first fluid channel whose flow cross-section can be adjusted by a main valve and a second fluid channel whose flow cross-section can be adjusted by means of a direction-orientated non-return valve according to the disclosure.

As a result of the measures set out in the following description and developments, advantageous improvements of the non-return valve set out in the following description for a solenoid valve and the solenoid valve set out in the following description are possible.

It is particularly advantageous that the abutment base may have a circular base face. In addition, there may be formed between the abutment base and the sealing cone a groove, which can partially receive the resilient sealing ring.

In an advantageous embodiment of the non-return valve, the closure element may have a reinforcement at the transition between the abutment base and the sealing cone. It is thereby advantageously possible for the stability of the closure element to be improved and for the service-life of the closure element to be extended.

In another advantageous embodiment of the non-return valve, the closure element may be constructed as an injection-molded plastics component. This enables cost-effective mass production of the closure element.

In another advantageous embodiment of the non-return valve, the resilient sealing ring may be constructed as an O-ring seal. Since O-ring seals are produced as mass products, a cost-effective production of the closure elements is thereby enabled.

In an advantageous embodiment of the solenoid valve, the non-return valve seat may be formed in the lower valve portion. Furthermore, the abutment base may in the open state of the non-return valve be in abutment with an abutment. The lower valve portion and/or a flat filter which is introduced into the lower valve portion, for example, form the abutment.

Embodiments of the disclosure are illustrated in the drawings and are explained in greater detail in the following description. In the drawings, the same reference numerals refer to components or elements which perform the same or similar functions.

DETAILED DESCRIPTION

Figure 1:
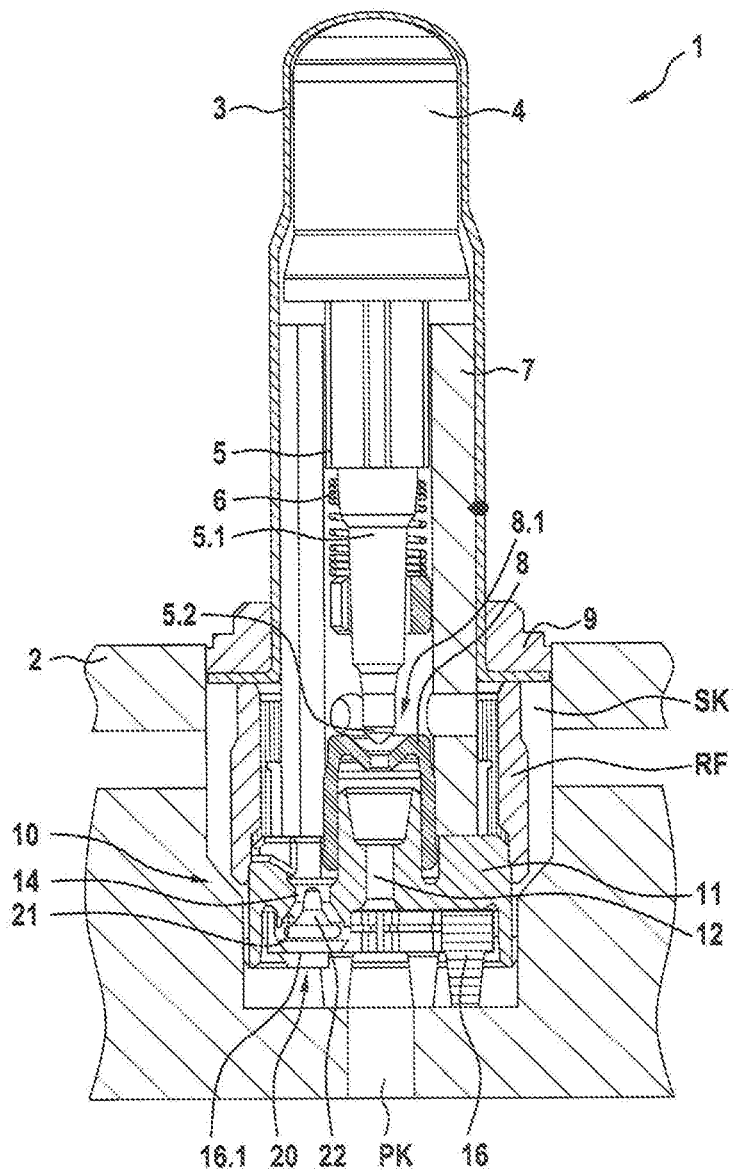
FIG. 1 is a schematic partially sectioned illustration of an embodiment of a valve cartridge and a lower valve portion with an embodiment of a non-return valve according to the disclosure for a solenoid valve.

As can be seen in FIG. 1, the illustrated embodiment of a valve cartridge 1 for a solenoid valve which is open in the currentless state comprises a capsule 3, a valve insert 7, an armature 4 having a tappet 5 which has a closure member 5.1 and a main sealing element 5.2, and a restoring spring 6. A magnet subassembly which is not illustrated in greater detail produces a magnetic force which moves the longitudinally movable armature 4 with the tappet 5 counter to the force of the restoring spring 6 against the valve insert 7. In addition, the valve insert 7 receives the valve body 8, which comprises a main valve seat 8.1, in which the main sealing element 5.2 is introduced in a sealing manner in order to implement the sealing function of the solenoid valve. As can further be seen in FIG. 1, the valve cartridge 1 illustrated comprises a non-return valve 20 according to the disclosure which performs a direction-orientated throughflow function.

As can further be seen in FIG. 1, the valve cartridge 1 is caulked by means of a caulking plate 9 with a receiving hole in a fluid block 2 and separates a primary circuit PK from a secondary circuit SK. Between the primary circuit PK and a fluid inlet and the secondary circuit SK and a fluid outlet there are formed in a base member 11 of the lower valve portion 10 a first fluid channel 12 whose flow cross-section can be adjusted by means of a main valve and a second fluid channel 12 whose flow cross-section can be adjusted by means of the direction-orientated non-return valve 20. As can further be seen in FIG. 1, the main sealing element 5.2 and the main valve seat 8.1 form the main valve.

As can further be seen in FIGS. 1 to 5, the non-return valve 20 according to the disclosure in the embodiment illustrated comprises a movable closure element 22, a non-return valve seat 21 which is arranged at the edge of the second fluid channel 14 in the lower valve portion 10 and a travel limitation or abutment 16.1 which delimits the maximum travel of the movable closure element 22. In the embodiment illustrated, the abutment 16.1 is constructed as part of a flat filter 16 which is introduced into the lower valve portion 10 and terminates it in a downward direction. In addition, a ring filter RF is placed on the lower valve portion 10. The lower valve portion 10, the flat filter 16 and the ring filter RF are in the embodiment illustrated produced as injection-molded plastics components. The closure element 22 is also constructed as an injection-molded plastics component and is carried by means of the fluid flow indicated as arrows and is also pressed at low system pressures into the non-return valve seat 21 which is constructed as a hollow cone into a sealing state. In an opening direction, the closure element 22 is placed by means of the fluid flow against the abutment 16.1 and the fluid can flow through the second fluid channel 14. The open position of the non-return valve 20 is illustrated in FIG. 1.

Figure 2:
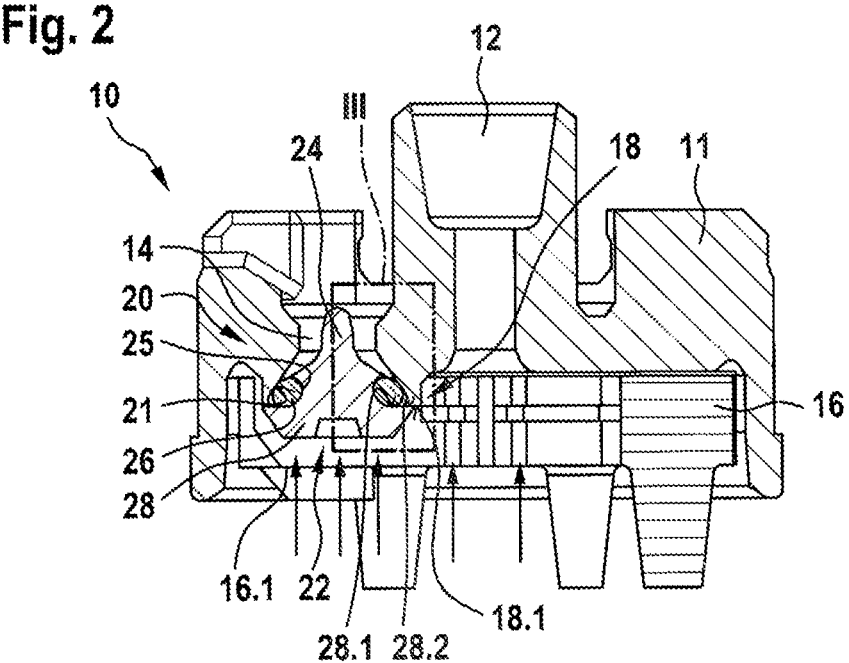
FIG. 2 is an enlarged sectioned illustration of the lower valve portion with a non-return valve from FIG. 1.
Figure 3:
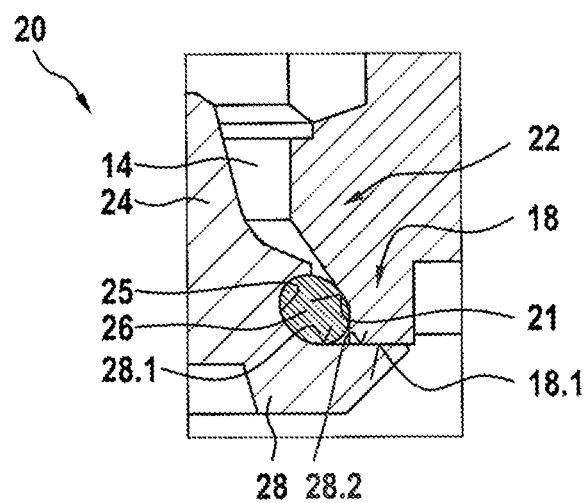
FIG. 3 is a detailed illustration of the non-return valve from FIGS. 1 and 2.
Figure 4:
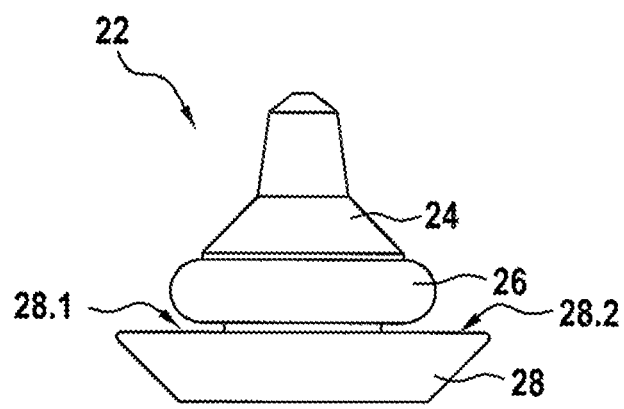
FIG. 4 is a schematic, perspective illustration of an embodiment of a closure element for the non-return valve according to the disclosure from FIGS. 1 to 3.
Figure 5:
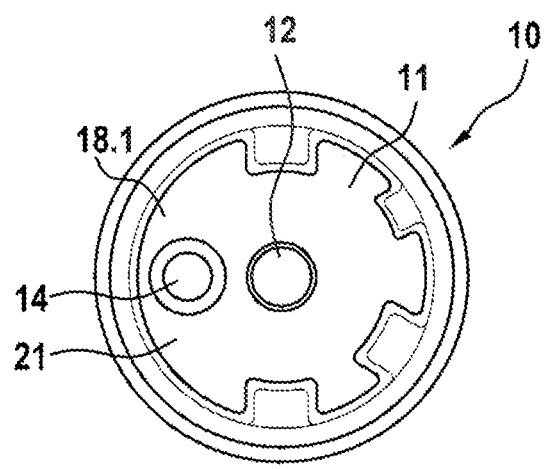
FIG. 5 is a schematic bottom view of the lower valve portion from FIGS. 1 to 4.

As can be seen in FIGS. 1 to 5, the illustrated embodiment of the movable closure element 22 comprises for carrying out the direction-orientated throughflow and sealing function of the non-return valve 20 according to the disclosure a sealing cone 24, an abutment base 28 and a resilient sealing ring 26 which is arranged between the abutment base 28 and the sealing cone 24. In the event of sealing, which is illustrated in FIG. 2, the abutment base 28 forms a support face 28.1 for the resilient sealing ring 26. In addition, at the edge of the non-return valve 21 there is formed a first support face 18.1 which in the event of sealing forms with a second support face 28.2 which is formed at the outer edge of the abutment base 28 in the direction of the non-return valve 21 a mechanical axial stop 18 for the movable closure element 22. In the embodiment illustrated, the support faces 18.1, 28.2 are constructed as planar faces. As a result of the support face 28.1 without discharge grooves and the mechanical axial stop 18 for the closure element 22, it is advantageously possible for the surface pressure of the sealing ring which is produced under pressure loading to be significantly reduced. In addition, the mechanical axial stop 18 in the event of sealing advantageously leads to a limitation of the abutment force acting on the resilient sealing ring 26. In addition, as a result of the removal of the axial discharge grooves and the abutment face 28.1 which is formed, an additional extrusion of the sealing ring 26 is advantageously prevented.

As can further be seen in FIGS. 1 to 5, the abutment base 28 has a circular base face, wherein between the abutment base 28 and the sealing cone 24 there is formed a groove 25 which partially receives the resilient sealing ring 26. The closure element 22 is preferably constructed as an injection-molded plastics component. The resilient sealing ring 26 is in the embodiment illustrated constructed as an O-ring seal. In addition, the closure element 22 has at the transition between the abutment base 28 and sealing cone 24 a reinforcement which is not described in greater detail.

As a result of the support edges 28.2A which are longer in comparison with the prior art, in the event of sealing with a consistent force, the local tensions in the event of an extrusion of the resilient sealing ring 26 in the discharge grooves 28.1 A are reduced.

Embodiments of the non-return valve according to the disclosure for a solenoid valve, as a result of the abutment face without discharge grooves and the mechanical axial stop for the closure element, advantageously reduce the surface pressure of the sealing ring which is produced under pressure loading. In addition, the mechanical axial stop in the event of sealing advantageously leads to a limitation of the abutment force acting on the resilient sealing ring.

What is claimed is:

1. A non-return valve for a solenoid valve, the non-return valve comprising:
   a non-return valve seat arranged at an edge of a fluid channel; and
   a movable closure element configured to carry out a direction-orientated throughflow and sealing function, the movable closure element including a sealing cone, an abutment base, and a resilient sealing ring, the resilient sealing ring arranged between the abutment base and the sealing cone, wherein:
   the abutment base forms, in the event of sealing, a ring support face portion for the resilient sealing ring,
   a mechanical axial stop portion extends toward the abutment base from the non-return valve seat and includes a first support face facing the abutment base,
   a second support face portion is formed at an outer edge of the abutment base facing the first support face and spaced apart from the ring support face portion,
   in the event of sealing, the first support face forms with the second support face portion a mechanical axial stop for the movable closure element with the resilient sealing ring contacting the non-return valve seat and an axially extending side of the mechanical axial stop portion,
   the mechanical axial stop portion is a protrusion of the lower valve portion in which the non-return valve seat is formed,
   the protrusion defines a first outer diameter,
   the abutment base defines a second outer diameter, and
   the second outer diameter matches the first outer diameter.

2. The non-return valve according to claim 1, wherein the abutment base has a circular base face.

3. The non-return valve according to claim 1, wherein:
   a groove is formed between the abutment base and the sealing cone, and
   the groove partially receives the resilient sealing ring.

4. The non-return valve according to claim 1, wherein the movable closure element includes a reinforcement at a transition between the abutment base and the sealing cone.

5. The non-return valve according to claim 1, wherein the movable closure element is an injection-molded plastics component.

6. The non-return valve according to claim 1, wherein the resilient sealing ring is an O-ring seal.

7. A solenoid valve, comprising:
   a magnet subassembly;
   a valve cartridge; and
   a lower valve portion including a fluid inlet and a fluid outlet, wherein:
   a first fluid channel is formed between the fluid inlet and the fluid outlet, the first fluid channel having a flow cross-section configured to be adjusted by a main valve,
   a second fluid channel is formed between the fluid inlet and the fluid outlet, the second fluid channel having a flow cross-section configured to be adjusted by a direction-orientated non-return valve, and
   the non-return valve includes:
   a non-return valve seat arranged at an edge of the second fluid channel; and
   a movable closure element configured to carry out a direction-orientated throughflow and sealing function, the movable closure element including a sealing cone, an abutment base, and a resilient sealing ring, the resilient sealing ring arranged between the abutment base and the sealing cone, wherein:
   the abutment base forms, in the event of sealing, a ring support face portion for the resilient sealing ring,
   a mechanical axial stop portion extends toward the abutment base from the non-return valve seat and includes a first support face facing the abutment base
   a second support face portion is formed at an outer edge of the abutment base facing the first support face and spaced apart from the ring support face portion,
   in the event of sealing, the first support face forms with the second support face portion a mechanical axial stop for the movable closure element with the resilient sealing ring contacting the non-return valve seat and an axially extending side of the mechanical axial stop portion,
   the mechanical axial stop portion is a protrusion of the lower valve portion,
   the protrusion defines a first outer diameter,
   the abutment base defines a second outer diameter, and
   the second outer diameter matches the first outer diameter.

8. The solenoid valve according to claim 7, wherein the non-return valve seat is formed in the lower valve portion.

9. The solenoid valve according to claim 7, wherein the abutment base, in an open state of the non-return valve, is in abutment with an abutment.

10. The solenoid valve according to claim 9, wherein at least one of the lower valve portion and a flat filter which is introduced into the lower valve portion forms the abutment.

11. A solenoid valve, comprising:
    a magnet subassembly;
    a valve cartridge;
    a lower valve portion including a fluid inlet and a fluid outlet;
    a first fluid channel formed between the fluid inlet and the fluid outlet, the first fluid channel having a flow cross-section configured to be adjusted by a main valve;
    a second fluid channel formed between the fluid inlet and the fluid outlet; and
    a direction-orientated non-return valve configured to adjust a flow cross-section of the second fluid channel, the direction-orientated non-return valve comprising:
    a closure element movable along an axis, the closure element including a sealing cone, an abutment base, and a resilient sealing ring, a ring support face portion of the abutment base supporting the resilient sealing ring at a location between the abutment base and the sealing cone;
    a non-return valve seat having an inlet extending from the second fluid channel; and
    a mechanical axial stop portion extending toward the abutment base from the non-return valve seat to and including a first support face extending directly radially outwardly from an outlet of the non-return valve seat, the first support face in opposition to and facing a second support face portion of the abutment base, which is coplanar with the ring support face portion, at a location radially outwardly of the resilient sealing ring, such that in the event of sealing, the first support face forms with the second support face portion a mechanical axial stop for the movable closure element with the resilient sealing ring contacting the non-return valve seat and the mechanical axial stop portion, wherein
the mechanical axial stop portion is a protrusion of the lower valve portion,
the protrusion defines a first outer diameter,
the abutment base defines a second outer diameter, and
the second outer diameter matches the first outer diameter.

\* \* \* \* \*